United States Patent [19]

Toussaint et al.

[11] Patent Number: 5,100,451

[45] Date of Patent: Mar. 31, 1992

[54] METHOD OF FORMING VITREOUS ENAMEL FROM SPHERULIZED PARTICLES

[75] Inventors: François Toussaint, Montignies-le-Tilleul; Pierre Laroche, Nalinnes, both of Belgium

[73] Assignee: Glaverbel, Brussels, Belgium

[21] Appl. No.: 517,805

[22] Filed: May 2, 1990

[30] Foreign Application Priority Data

May 10, 1989 [GB] United Kingdom ................ 8910768

[51] Int. Cl.$^5$ ............................................ C03B 20/00
[52] U.S. Cl. ............................................ 65/18.1; 264/56; 501/14; 156/89; 65/21.3; 65/144; 428/325
[58] Field of Search ............ 65/18.1, 18.2, 21.3, 65/144; 264/56; 501/14; 428/209, 325, 426; 156/89

[56] References Cited

U.S. PATENT DOCUMENTS

| | | | |
|---|---|---|---|
| 1,995,803 | 3/1935 | Gilbert | 65/21.3 |
| 2,008,327 | 7/1935 | Kuppinger | 65/18.1 |
| 2,676,892 | 4/1954 | McLaughlin | 501/85 |
| 3,867,166 | 2/1975 | Sullivan | 428/325 |
| 4,698,317 | 10/1987 | Inoue et al. | 501/9 |
| 4,751,202 | 6/1988 | Toussaint et al. | 501/12 |
| 4,816,067 | 3/1989 | Kopatz et al. | 65/21.3 |
| 4,894,081 | 1/1990 | Neusy | 65/21.3 |

FOREIGN PATENT DOCUMENTS

| | | |
|---|---|---|
| 8202707 | 8/1982 | PCT Int'l Appl. . |
| 578580 | 7/1946 | United Kingdom . |
| 1066683 | 4/1967 | United Kingdom . |
| 1066684 | 4/1967 | United Kingdom . |
| 1255968 | 12/1971 | United Kingdom . |

OTHER PUBLICATIONS

Kingery, W. D., ed., Introduction to Ceramics, 1976, pp. 9–10.

Primary Examiner—Richard V. Fisher
Assistant Examiner—John J. Bruckner
Attorney, Agent, or Firm—Spencer, Frank & Schneider

[57] ABSTRACT

A method of manufacturing a vitreous enamel body includes forming particles of vitreous material and melting to fuse the particles together to form the body. The particles of vitreous material are spherulized and are selected as to their granulometric properties according to the degree of compaction required in the finished enamel body. From 20% to 40% of the bulk volume of the mixture is a fine particle size fraction. Such a finished enamel body may be a coating, for example a high-compacity enamel coating on a bathtub, or it may be a self-sustaining body, for example a porous vitreous filter element. Porous coatings and compact self-sustaining bodies may also be made.

20 Claims, No Drawings

METHOD OF FORMING VITREOUS ENAMEL FROM SPHERULIZED PARTICLES

BACKGROUND OF THE INVENTION

Field of the Invention

This invention relates to a method of manufacturing a vitreous enamel body comprising forming particles of vitreous material and fusing the particles together to form the body.

The term "vitreous material" is used herein in a broad sense and it includes glass, vitrocrystalline and vitroceramic materials. Bodies of fused vitreous enamels are used for various purposes. The body may be formed as a coating, for example a plain coating on sanitary ware such as baths or a plain or patterned coating on ceramic tiles, or it may be a self-sustaining article such as a hob (stovetop) of a domestic cook stove. The enamel body may be substantially wholly compact, that is with substantially no voids, as is desirable in the case of enamel coatings on baths, or it may be less compact, that is, more porous. An example of a porous, self sustaining article is a vitreous filter element.

SUMMARY OF THE INVENTION

There is thus a requirement for bodies of fused vitreous enamel which have different degrees of compaction, and it is an object of this invention to provide a method of manufacturing such bodies.

According to the invention, there is provided a method of manufacturing a vitreous enamel body comprising forming particles of vitreous material and fusing the particles together to form the body, characterised in that the said particles of vitreous material are spherulized and are selected as to their granulometric properties according to the degree of compaction required in the finished enamel body.

We have found that by controlling the granulometric properties of the vitreous particles used for forming the body, it is possible to manufacture such bodies with various degrees of compaction. In general, we have found that for a high degree of compaction it is desirable to use vitreous particles having a rather wide size range spread, and for bodies with a low degree of compaction it is desirable to use vitreous particles with a narrow grain size distribution. It is of course well known that in a mass of loose particles of a given material, the bulk density will decrease (that is, the amount of voids will increase) with decrease in the size range spread of those particles but it is surprising that this should be maintained in a body formed by a process in which those particles may all become completely melted. What is even more surprising is that controlling the granulometric properties of the vitreous particles gives rise to a body having a certain degree of compaction which is sufficiently reproducible for reliable manufacture on an industrial scale. The use of spherulized vitreous particles promotes the reliability with which a given degree of compaction can be obtained from a quantity of vitreous particles of a given granulometry, and also allows the achievement of a higher degree of compaction than can be achieved simply by using crushed, non-spherulized vitreous particles.

Spherulized vitreous particles may be formed in various ways. For example particles of crushed vitreous material may be spherulized in a conventional spherulizing furnace in a manner known per se. Preferably, however, the said particles of vitreous material are formed and spherulized in a single step by dispersing molten vitreous material in bead form by centrifugal force. The manufacture of spherulized vitreous particles in this way allows ready control of the mean diameter of the spherulized particles, and produces such spherulized particles in a grain size distribution which is convenient and carries advantages for many of the purposes in view. Spherulized vitreous particles may for example be formed by a process as set out in any of British Patent Specifications Nos. 1,066,683, 1,066,684, and 1,255,968.

When forming vitreous particles by a centrifugal process, it is desirable that the vitreous composition used should have a rather narrow transformation zone. The expression "transformation zone" is used to denote the temperature range over which the viscosity of the vitreous material lies between 1000 poise (100 Pa s) and $10^5$ poise ($10^4$ Pa s). If the transformation zone is rather wide, for example 280° C. to 300° C., as is typically the case with ordinary soda-lime window glass, a certain proportion of the centrifuged vitreous material tends to form fibres or tear drops. For the reliable production of spherulized vitreous particles it is therefore preferable that the difference between the temperatures at which the vitreous material has a viscosity of 1000 poise (100 Pa s) and $10^5$ poise ($10^4$ Pa s) is less than 250° C., preferably less than 200° C. and optimally less than 150° C.

An example of an enamel frit having a suitably narrow transformation zone which may for example be used for forming an enamel coating on metal articles such as bathtubs has the following calculated composition:

| | | |
|---|---|---|
| $B_2O_3$ | 29.00 | % by weight |
| $SiO_2$ | 18.00 | |
| $Na_2O$ | 14.00 | |
| $Al_2O_3$ | 14.00 | |
| CaO | 12.00 | |
| $ZrO_2$ | 9.00 | |
| F | 4.00 | |

A glass of such a composition has a viscosity-temperature curve which is very steep in the viscosity range of the transformation range as defined. The temperature for a viscosity of 100 Pa s is 830° C., while the temperature for a viscosity of $10^4$ Pa s is 760° C. Thus the temperature range of the transformation zone is quite narrow at 70° C., and the glass is eminently suitable for the formation of microbeads by a centrifugal process.

In the most preferred embodiments of the invention, the said spherulized particles of vitreous material are substantially all below 800 micrometers in diameter. Spherulized particles of such sizes are most useful for fusing to form an enamel body, and because of their size it is convenient to refer to them as "vitreous microbeads."

In some preferred embodiments of the invention, the said spherulized particles of vitreous material have a mean diameter between 400 micrometers and 500 micrometers. Vitreous microbeads of such sizes are especially useful for forming enamel coatings on ceramic tiles.

In other preferred embodiments of the invention, the said spherulized particles of vitreous material are substantially all below 150 micrometers in diameter. Such vitreous microbeads are especially useful for forming enamel coatings on sanitary ware.

The mean diameter $\Phi$ of vitreous microbeads formed by centrifuging can be controlled quite easily. We have found that the mean diameter (measured in centimeters) can be predicted by the equation:

$$\Phi = \left\{ \frac{\sigma^3 \times \eta \times Q}{\rho^4 \times \omega^8 \times R^5} \right\}^{1/9} \times C.$$

where $\sigma$ is the surface tension (dyne/cm) and $\eta$ is the dynamic viscosity (poise) of the fluid vitreous material leaving a centrifuging rotor of radius R (cm) rotating at an angular velocity of $\omega$ (rad/sec), the vitreous material having a density of $\rho$ g/cm$^3$ and being supplied to the rotor at a rate of Q cm$^3$/sec. C is a constant.

In order to promote the compacity of a body of enamel from spherulized particles, it would be possible to use particles of a very wide size range spread, the particles being uniformly distributed in size over that range. However, to do so would in practice involve certain problems. It is not easy to arrange a spherulizing or manufacturing process which will of itself yield a uniform distribution of spherulized particles over such a very wide size range: applying such particles to a substrate in such manner that their size distribution over the area of the substrate remains uniform may not be easy: the type of coating required may not permit the use of particles having a very wide size distribution.

The problem of achieving high compacity may however be alleviated by the use of a mixture of two or more fractions of spherulized particles having relatively narrow size range distributions but different mean diameters. In some preferred embodiments of the invention therefore, said spherulized particles comprise a mixture of two or more different fractions, the particles of a first ("coarse") fraction having a mean diameter which is at least twice, and preferably at least three times, the mean diameter of a second ("fine") fraction. In such embodiments, the mixture of spherulized particles preferably comprises said fine fraction in a proportion between 20% and 40%, and optimally between 25% and 30%, by bulk volume, of the total mixture.

In some embodiments of the invention, the difference between the mean diameters of the particles of such a coarse and fine fraction is large. This allows, for example, the formation of enamel coatings which have a slightly textured surface. Such a coating might be applied to form a "non-slip" area on a shower-stall basin. However, beyond a certain ratio between the mean diameters of the particles of such a coarse and fine fraction, there is no appreciable gain in compacity, and problems may be encountered in operation, due for example to segregation of the different fractions. Preferably therefore, the particles of said coarse fraction have a mean diameter which is not more than 17 times the mean diameter of the particles of said fine fraction.

The problem of achieving low compacity, that is high porosity, is alleviated by choosing the spherulized particles so that their grain size distribution is as narrow as possible, and so that their mean grain size is large.

In some preferred embodiments of the invention, the finished enamel body is a self sustaining article. The product of the method of the invention may for example be constituted as a porous body, such as a vitreous filter element, or as a substantially non-porous body having a high degree of compaction such as a vitro-ceramic hob for a domestic cooker.

In other preferred embodiments of the invention, the finished enamel body is a coating formed on a substrate. Such a coating may be formed on substrates of various materials, for example the substrate may be a ceramic such as a wash-basin or tile, or it may be a metal, such as an iron bathtub.

To form a coating, the vitreous microbeads may be applied as a layer to the substrate in various ways. For example the microbeads may be applied in a binder. Alternatively, such microbeads may be applied as powder onto a coating of binder material applied to the substrate. Such a binder could be organic or inorganic. The use of a binder affords advantages in the achievement of a uniform coating layer especially when the substrate to be coated is of a rather complicated shape, as is for example the case with sanitary ware. In some preferred embodiments of the invention therefore, the said spherulized particles of vitreous material are applied as a coating layer and held in place by a binder before they are fused in situ. The use of a binder also allows serigraphic deposition of the microbeads so that a patterned enamel layer can result.

In some circumstances, however, the use of a binder can give rise to problems when firing the enamel. The presence of the binder might adversely affect the way in which the enamel fuses together, or residues of the binder might adversely affect the properties of the resulting coating. In certain other preferred embodiments of the invention, therefore, the said spherulized particles of vitreous material are applied as a coating layer by an electrostatic spraying technique and fused in situ. Such a technique is especially suitable for use when coating planar substrates such as tiles, and other uncomplicated shapes. An electrostatic spraying technique does not require the presence of a binder, so any problems associated with the use of a binder are avoided.

Those skilled in the art will readily be able to determine whether the use of a binder or an electrostatic spraying technique is more appropriate for forming an enamel layer on any given article.

In yet other embodiments of the invention, the enamel body may be constituted as a weld mass between two other bodies. Such other bodies may for example be of ceramic or vitreous material. Such an enamel body is also useful for joining a ceramic or vitreous body to a metal body.

The invention extends to an article comprising a vitreous enamel body manufactured by a method as herein defined.

DESCRIPTION OF THE PREFERRED EMBODIMENTS

Preferred embodiments of the invention will now be described by way of example only.

EXAMPLE 1

It is desired to provide a cast iron bathtub with an enamel coating. Glass is melted in a furnace (which may be a continuous furnace or a pot furnace) and is fed to the apparatus described with reference to FIGS. 1 to 4 of British Patent Specification No. 1,255,968. The glass has the following calculated composition:

| | | |
|---|---|---|
| $B_2O_3$ | 29.00 | % by weight |
| $SiO_2$ | 18.00 | |
| $Na_2O$ | 14.00 | |
| $Al_2O_3$ | 14.00 | |
| CaO | 12.00 | |

|  |  |
|---|---|
| ZrO$_2$ | 9.00 |
| F | 4.00 |

The rotating disc used had a diameter of 40 cm and it was rotated at a rate of 2700 rpm. The temperature of the glass was controlled so that it had a viscosity of about 5 Pa s while in contact with the disc, and the glass was fed at a rate of 10 kg per hour. This resulted in the formation of spherulized vitreous particles having a mean diameter of about 80 micrometers with a fairly wide size range spread to promote good compaction or low porosity in the finished enamel coating.

The vitreous microbeads are electrostatically sprayed onto the cast iron bathtub and the piece is then fired at 600° C. for 1 hour to fuse the enamel into a compact coating.

Such an enameled bath may be subjected to an aging test comprising subjecting the bath to contact with an aqueous detergent solution for 240 hours at 60° C: the solution is analysed for material leached out of the enamel coating, and the rugosity of the coating is measured. An enameled bath manufactured in accordance with this Example gives highly satisfactory results when subjected to that test.

In a variant of this Example, in order further to promote a high degree of compaction in the enamel coating, a mixture of fine and coarse fractions of particles was used. The rotating disc was spun at 3100 rpm in order to produce a fine fraction of spherulized vitreous particles having a mean diameter of about 20 micrometers. The rotating disc was then spun at 2500 rpm in order to produce a coarser fraction of spherulized vitreous particles having a mean diameter of about 120 micrometers. The fine and coarser fractions were mixed together in the proportions 3 liters of fine particles to 7 liters of coarser particles.

In a second variant, a glass of the following calculated composition was used:

|  |  |  |
|---|---|---|
| SiO$_2$ | 52.37 | % by weight |
| Na$_2$O | 12.00 |  |
| PbO | 10.00 |  |
| CaO | 7.00 |  |
| TiO$_2$ | 6.93 |  |
| B$_2$O$_3$ | 6.52 |  |
| Li$_2$O | 2.78 |  |
| F | 1.80 |  |
| ZnO | 0.54 |  |

EXAMPLE 2

It is desired to apply a patterned enamel coating to ceramic tiles. Vitreous material is melted in a furnace. The vitreous material has the following calculated composition:

|  |  |  |
|---|---|---|
| SiO$_2$ | 56.92 | % by weight |
| B$_2$O$_3$ | 12.18 |  |
| ZrO$_2$ | 8.00 |  |
| Al$_2$O$_3$ | 6.82 |  |
| BaO | 5.21 |  |
| Na$_2$O | 4.77 |  |
| CaO | 3.00 |  |
| ZnO | 1.86 |  |
| K$_2$O | 0.83 |  |
| MgO | 0.19 |  |
| Fe$_2$O$_3$ | 0.14 |  |

|  |  |
|---|---|
| TiO$_2$ | 0.08 |

The melt is poured into water, or between cooled rollers, in a manner known per se so that the solidified glass is fragmented by thermal shock. Fragments of the glass, which is opalescent, are then crushed and spherulized in a spherulizing furnace which may be heated electrically or by flame. The resulting microbeads are screened to give a relatively fine fraction having diameters in the range 105 micrometers to 210 micrometers, and a coarser fraction having diameters in the range 500 micrometers to 840 micrometers. The two fractions of microbeads are mixed together in the proportions 2.5 liters of the fine fraction to 7.5 liters of the coarser fraction, and the mixture of those particles is then applied to the ceramic tiles by a serigraphic technique. The tiles are fired at 1000° C. for 3 hours at sub-atmospheric pressure and under conditions to induce the formation of a crystalline phase in the enamel. This results in the formation of a low-porosity patterned vitrocrystalline enamel layer on the tiles.

EXAMPLE 3

It is desired to form a vitroceramic hob for a domestic cooker. Vitreous material is melted in a furnace. The vitreous material has the following calculated composition:

|  |  |  |
|---|---|---|
| SiO$_2$ | 69.70 | % by weight |
| Al$_2$O$_3$ | 17.80 |  |
| TiO$_2$ | 4.70 |  |
| Li$_2$O | 2.80 |  |
| MgO | 2.60 |  |
| ZnO | 1.00 |  |
| As$_2$O$_3$ | 0.60 |  |
| Na$_2$O | 0.40 |  |
| K$_2$O | 0.20 |  |
| ZrO$_2$ | 0.10 |  |
| Fe$_2$O$_3$ | 0.10 |  |

The vitreous material is formed into particles and spherulized. The resulting microbeads are screened to give a relatively fine fraction of which at least 70% passes a 44 micrometers screen, and a coarser fraction having diameters in the range 500 micrometers to 840 micrometers.

The two fractions of microbeads are mixed together in the proportions 2.8 liters of the fine fraction to 7.2 liters of the coarser fraction, and the spherulized particles are then pressed and moulded to the desired shape, and are fused together to form the hob.

After fusing of the enamel, cooling is controlled to achieve phase separation including the formation of β-spodumene which has low thermal expansion and high mechanical resistance. The resulting hob has better resistance to mechanical shock than a hob formed in the same way from unspherulized grains of the same granulometry and composition, even when fired and cooled in the same way.

In a variant of this Example, the spherulized vitreous particles are applied as a layer on a metal substrate to form an enamel coating.

What is claimed is:

1. A method of manufacturing an article comprised of vitreous enamel which is present at least as a coating and which has a defined degree of compaction, the method comprising:

a. forming spherulized particles comprised of vitreous material;
b. forming the article by one of coating the spherulized particles onto a substrate and molding the spherulized particles into a defined shape; and
c. melting the spherulized particles to fuse the spherulized particles together to form the vitreous enamel, wherein the spherulized particles of vitreous enamel have a particle size distribution selected according to the degree of compaction required in the finished vitreous enamel, wherein the spherulized particles comprise a mixture of at least two fractions including a coarse fraction and a fine fraction, each of the at least two fractions having a mean diameter which is different from that of the other fractions, and the coarse fraction having a mean diameter which is at least twice the mean diameter of the fine fraction, wherein the mixture has a bulk volume, and
wherein from 20% to 40% of the bulk volume of the mixture is the fine fraction.

2. The method according to claim 1, wherein the spherulized particles of vitreous material are formed by dispersing molten vitreous material in bead form by centrifugal force.

3. The method according to claim 1, wherein the vitreous material has a first temperature at which the vitreous material has a viscosity of 1000 poise (100 Pa s) and a second temperature at which the vitreous material has a viscosity of $10^5$ poise ($10^4$ Pa s), and wherein the difference between the first temperature and the second temperature is less than 250° C.

4. The method according to claim 3, wherein the difference between the first temperature and the second temperature is less the 200° C.

5. The method according to claim 4, wherein the difference between the first temperature and the second temperature is less than 150° C.

6. The method according to claim 1, wherein substantially all of the spherulized particles of vitreous material have a diameter which is below 800 micrometers.

7. The method according to claim 6, wherein the spherulized particles of vitreous material have a mean diameter which is below 150 micrometers.

8. The method according to claim 1, wherein the spherulized particles comprise a mixture of at least two fractions including a fraction and a fine fraction, each of the at least two fractions having a mean diameter which is different from that of the other fractions, and wherein the coarse fraction has a mean diameter which is a least twice the mean diameter of the fine fraction.

9. The method according to claim 8, wherein the coarse fraction has a mean diameter which is not more than 17 times the mean diameter of the fine fraction.

10. The method according to claim 8, wherein the mean diameter of the coarse fraction is at least three times the mean diameter of the fine fraction.

11. The method according to claim 1, wherein the article is entirely composed of the vitreous enamel.

12. The method according to claim 1, wherein the vitreous enamel is a coating formed on the substrate.

13. The method according to claim 12, further comprising admixing the spherulized particles of vitreous material with a binder before the coating is formed on the substrate.

14. The method according to claim 12, wherein the coating is formed by an electrostatic spraying technique and fused in situ.

15. The method according to claim 12, further comprising coating a layer comprised of a binder material onto the substrate prior to coating the spherulized particles thereon.

16. An article comprising a vitreous enamel which is present at least as a coating, and which has a defined degree of compaction, the article being manufactured by the method according to claim 1.

17. The method according to claim 1, wherein the mixture has a bulk volume and wherein from 25% to 30% of the bulk volume of the mixture is comprised of the fine fraction.

18. The method according to claim 1, wherein the granulometric properties are selected so that a high degree of compaction is obtained by using a mixture of at least two fractions of spherulized particles having narrow particle size range distributions but different mean diameters and so that a low degree of compaction is obtained by using spherulized particles having a narrow particle size range distribution and large but different mean diameters.

19. The method according to claim 1, wherein substantially all of the spherulized particles are melted in step c.

20. The method according to claim 1, wherein the spherulized particles formed in step a are solid.

* * * * *